United States Patent
Ham et al.

(10) Patent No.: US 11,549,826 B2
(45) Date of Patent: Jan. 10, 2023

(54) APPARATUS AND METHOD FOR DETECTING PHASE DELAY OF RESOLVER

(71) Applicants: HYUNDAI MOTOR COMPANY, Seoul (KR); KIA CORPORATION, Seoul (KR)

(72) Inventors: Do Hyeon Ham, Goyang-si (KR); Jun Jang, Mokpo-si (KR); Hun Kong, Suwon-si (KR); Jang Ho Won, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 11 days.

(21) Appl. No.: 17/459,668

(22) Filed: Aug. 27, 2021

(65) Prior Publication Data
US 2022/0268604 A1 Aug. 25, 2022

(30) Foreign Application Priority Data
Feb. 22, 2021 (KR) .................. 10-2021-0023605

(51) Int. Cl.
*H02P 23/00* (2016.01)
*G01D 5/244* (2006.01)
*H02K 24/00* (2006.01)

(52) U.S. Cl.
CPC ....... *G01D 5/24476* (2013.01); *G01D 5/2448* (2013.01); *H02K 24/00* (2013.01); *H02P 23/00* (2013.01)

(58) Field of Classification Search
CPC .. H02K 24/00; G01D 5/24476; G01D 5/2448; H02P 23/00
See application file for complete search history.

(56) References Cited

U.S. PATENT DOCUMENTS

| | | | |
|---|---|---|---|
| 6,834,244 B2 * | 12/2004 | Kim | H03M 1/1014 318/605 |
| 10,401,197 B2 | 9/2019 | Park et al. | |
| 10,419,002 B1 | 9/2019 | Lee | |
| 10,756,655 B2 | 8/2020 | Bang | |
| 2008/0106229 A1 | 5/2008 | Kosaka et al. | |
| 2015/0137728 A1* | 5/2015 | Wand | G01D 5/14 318/605 |
| 2015/0362347 A1 | 12/2015 | Park et al. | |

(Continued)

FOREIGN PATENT DOCUMENTS

| | | |
|---|---|---|
| KR | 100936290 B 1 | 1/2010 |
| KR | 101610473 B 1 | 4/2016 |

(Continued)

*Primary Examiner* — Rina I Duda
(74) *Attorney, Agent, or Firm* — Morgan, Lewis & Bockius LLP (57) ABSTRACT

An apparatus and a method for detecting a phase delay of a resolver are provided. The apparatus includes a resolver configured to output a signal corresponding to a rotation angle of a motor, an excitation signal generator configured to generate an excitation signal using a square wave signal, and a controller configured to differentiate the signal to obtain a differential signal, detect a time when the differential signal meets a reference voltage as a peak time of the signal, and detect a phase delay time of the signal based on the peak time of the signal and an edge time of the square wave signal.

20 Claims, 10 Drawing Sheets

(56) References Cited

U.S. PATENT DOCUMENTS

2016/0087561 A1* 3/2016 Rho .................. H02P 6/28
                                                318/400.04
2017/0227567 A1* 8/2017 Son .................. G06F 3/0673
2019/0288619 A1   9/2019 Bang

FOREIGN PATENT DOCUMENTS

| KR | 102019384 B 1      | 9/2019  |
| KR | 10-2020-0012572 A  | 2/2020  |
| KR | 10-2020-0053772    | 5/2020  |
| KR | 10-2020-0033060 A  | 10/2020 |

* cited by examiner

APPARATUS AND METHOD FOR DETECTING PHASE DELAY OF RESOLVER

CROSS-REFERENCE TO RELATED APPLICATION

This application claims the benefit of priority to Korean Patent Application No. 10-2021-0023605, filed on Feb. 22, 2021, the entire contents of which are incorporated herein by reference.

TECHNICAL FIELD

The present disclosure relates to technologies of detecting a phase delay time of a resolver output signal.

BACKGROUND

An electric vehicle is a vehicle which drives its electric motor using its high-voltage battery to travel, which includes a hybrid electric vehicle (HEV), an electric vehicle (EV), a plug-in hybrid electric vehicle (PHEV), a fuel cell electric vehicle (FCEV), or the like. The electric motor provided in such an electric vehicle is implemented as a permanent magnet synchronous motor (PMSM). In this case, a resolver should be provided to drive the PMSM.

For reference, the resolver is a sensor for measuring a position of a rotor of the motor, which has higher mechanical strength and better durability than an encoder to be mainly used in a field, such as an electric vehicle or a robot, which is required for high performance driving and high precision driving. Such a resolver has a stator and a rotor. A single-phase exciting winding and a two-phase detection winding are wound on the stator, and a steel core shape varies with a rotation angle in the rotor such that the rotor is subject to fluctuation in magnetic flux interlinkage. A resolver digital converter (RDC) applies a high-frequency reference signal (an excitation signal) in the form of a sine wave of a few kHz to dozens of kHz to the exciting winding of the stator, and thus a counter electromotive force occurs while the rotor rotates. The primary and secondary magnetic flux interlinkage is periodically changed by the counter electromotive force to output a sine wave signal and a cosine wave signal. Such an output signal is output in the form of multiplying the signal generated by the magnetic flux interlinkage by an excitation signal.

The RDC may detect a position angle of the rotor using the sine wave signal and the cosine wave signal output from the resolver. In this case, to improve accuracy and efficiency of control of the motor, the position angle of the rotor should be accurately detected without an error. Ideally, a phase delay should not occur between an excitation signal and an output signal of the resolver. However, due to a time delay generated in a process where the RDC filters a square wave signal based on a hardware filter (a low pass filter and a band pass filter) to generate an excitation signal, a phase delay occurs between the excitation signal and the output signal of the resolver.

In an existing technology of detecting a phase delay of such a resolver, in detecting a peak of a resolver output signal, there is an increase in the amount of calculation increases because of using multiple thresholds, and thus there is an increase in a time required to detect a peak of the resolver output signal.

Details described in the background art are written to increase the understanding of the background of the present disclosure, which may include details rather than an existing technology well known to those skilled in the art.

SUMMARY

An aspect of the present disclosure provides an apparatus and a method for detecting a phase delay of a resolver to differentiate a resolver output signal to obtain a differential signal, detect a time when the differential signal meets a reference voltage as a peak time of the resolver output signal, and calculate a phase delay time of the resolver output signal within a reference range based on the peak time of the resolver output signal and an edge time of a square wave signal for excitation signal generation to detect the phase delay time of the resolver output signal at high accuracy, although distortion occurs in the resolver output signal, and quickly detect the phase delay time of the resolver output signal.

The technical problems to be solved by the present disclosure are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, an apparatus for detecting a phase delay of a resolver may include a resolver that outputs a signal corresponding to a rotation angle of a motor, an excitation signal generator that generates an excitation signal using a square wave signal, and a controller that differentiates the signal output by the resolver to obtain a differential signal, detects a time when the differential signal meets a reference voltage as a peak time of the signal output by the resolver, and detects a phase delay time of the signal output by the resolver based on the peak time of the signal output by the resolver and an edge time of the square wave signal.

In one form of the present disclosure, the excitation signal generator may filter the square wave signal to generate the excitation signal.

In one form of the present disclosure, the excitation signal generator may be implemented as a combination of a band pass filter (BPF) and a low pass filter (LPF).

In one form of the present disclosure, the controller may determine a current state as an error, when a difference between the edge time of the square wave signal and the peak time of the signal output by the resolver departs from a reference range.

In one form of the present disclosure, the controller may include an edge time detector that detects a rising edge time of the square wave signal, a low pass filter (LFP) that removes noise from the signal output by the resolver, a differentiator that differentiates the signal, the noise of which is removed by the LPF, to output the differential signal, a band pass filter (BPF) that filters the differential signal output by the differentiator, a reference time detector that detects a time when the differential signal passing through the BPF meets the reference voltage, a peak time detector that detects the time detected by the reference time detector as the peak time of the signal output by the resolver, a subtractor that subtracts the rising edge time of the square wave signal, the rising edge time being detected by the edge time detector, from the peak time detected by the peak time detector, and a delay time calculator that calculates the phase delay time of the signal output by the resolver based on the result subtracted by the subtractor.

In one form of the present disclosure, the apparatus may further include a limiter that limits a range of the result subtracted by the subtractor. In this case, the delay time calculator may calculate the phase delay time of the signal output by the resolver based on the subtracted result, the range of which is limited by the limiter.

In one form of the present disclosure, the LPF may have a set cut-off frequency greater than or equal to a reference value than a frequency of the signal output by the resolver.

In one form of the present disclosure, the apparatus may be applied to a system for controlling a drive power of the motor.

According to another aspect of the present disclosure, a method for detecting a phase delay of a resolver may include generating, by an excitation signal generator, an excitation signal using a square wave signal and differentiating, by a controller, a resolver output signal to obtain a differential signal, detecting, by the controller, a time when the differential signal meets a reference voltage as a peak time of the resolver output signal, and detecting, by the controller, a phase delay time of the resolver output signal based on the peak time of the resolver output signal and an edge time of the square wave signal.

In one form of the present disclosure, the generating of the excitation signal may include filtering the square wave signal to generate the excitation signal.

In one form of the present disclosure, the generating of the excitation signal may include sequentially passing the square wave signal through a band pass filter (BPF) and a low pass filter (LPF) to generate the excitation signal.

In one form of the present disclosure, the detecting of the phase delay time of the resolver output signal may include determining a current state as an error, when a difference between the edge time of the square wave signal and the peak time of the resolver output signal departs from a reference range.

In one form of the present disclosure, the detecting of the phase delay time of the resolver output signal may include detecting a rising edge time of the square wave signal, removing noise of the resolver output signal, differentiating the resolver output signal, the noise of which is removed, to output the differential signal, band pass filtering the differential signal, detecting a time when the band pass filtered differential signal meets the reference voltage, detecting the detected time as the peak time of the resolver output signal, subtracting the detected rising edge time of the square wave signal from the detected peak time of the resolver output signal, and calculating the phase delay time of the resolver output signal based on the subtracted result.

In one form of the present disclosure, the method may further include limiting a range of the subtracted result and calculating the phase delay time of the resolver output signal based on the subtracted result, the range of which is limited.

In one form of the present disclosure, the removing of the noise of the resolver output signal may be performed using a low pass filter (LPF). The removing of the noise of the resolver output signal may include setting a cut-off frequency greater than or equal to a reference value in the LPF than a frequency of the resolver output signal.

According to another aspect of the present disclosure, an apparatus for detecting a phase delay of a resolver may include an edge time detector that detects a rising edge time of a square wave signal, a low pass filter (LFP) that removes noise of a resolver output signal, a differentiator that differentiates the resolver output signal, the noise of which is removed by the LPF, to output a differential signal, a band pass filter (BPF) that filters the differential signal output from the differentiator, a reference time detector that detects a time when the differential signal passing through the BPF meets a reference voltage, a peak time detector that detects the time detected by the reference time detector as a peak time of the resolver output signal, a subtractor that subtracts the rising edge time of the square wave signal, the rising edge time being detected by the edge time detector, from the peak time of the resolver output signal, the peak time being detected by the peak time detector, and a delay time calculator that calculates a phase delay time of the resolver output signal based on the result subtracted by the subtractor.

DRAWINGS

The above and other objects, features and advantages of the present disclosure will be more apparent from the following detailed description taken in conjunction with the accompanying drawings.

DETAILED DESCRIPTION

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like maybe used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
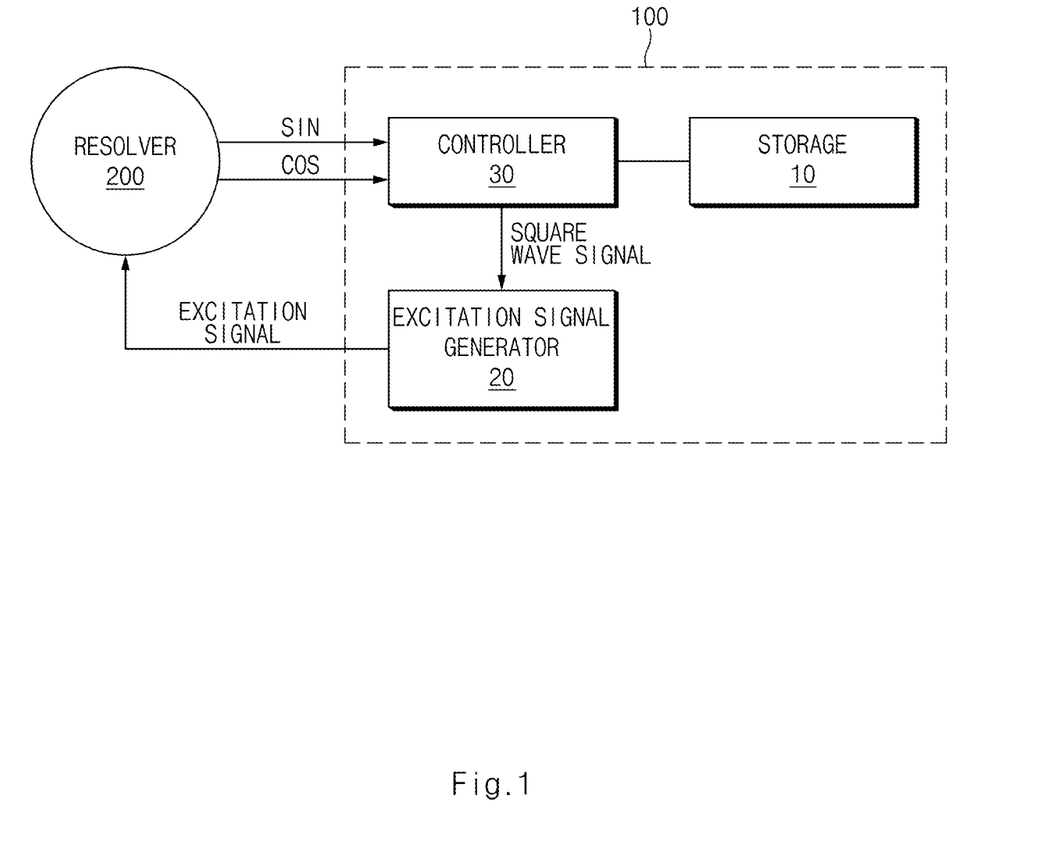
FIG. 1 is a block diagram illustrating a configuration of an apparatus for detecting a phase delay of a resolver in one form of the present disclosure.

FIG. 1 is a block diagram illustrating a configuration of an apparatus for detecting a phase delay of a resolver in some forms of the present disclosure.

As shown in FIG. 1, an apparatus 100 for detecting a phase delay of a resolver in some forms of the present, disclosure may include a storage 10, an excitation signal generator 20, and a controller 30. In this case, the respective components may be combined into one component and some components may be omitted, depending on a manner which executes the apparatus 100 for detecting the phase delay of the resolver in some forms of the present disclosure. Furthermore, the apparatus 100 for detecting the phase delay of the resolver in some forms of the present disclosure may be implemented in a resolver digital converter (RDC) or may be implemented as a configuration independent of the RDC.

Seeing the respective components, first of all, the storage 10 may store various logics, algorithms, and programs required in a process of differentiating a resolver output signal to obtain a differential signal, detecting a time when the differential signal meets a reference voltage as a peak time of the resolver output signal, and calculating a phase delay time of the resolver output signal within a reference range ($t_{PT}-\Delta t<t_{PT}<t_{PT}+\Delta t$, where $t_{PT}$ is the peak time of the resolver output signal and where $\Delta t$ is, for example, 2 µs) based on the peak time of the resolver output signal and an edge time of a square wave signal for excitation signal generation. In this case, the resolver output signal may be a sine wave signal or a cosine wave signal.

The storage 10 may store frequency information and an output voltage of the resolver output signal or frequency information and an output voltage of the square wave signal. In this case, the resolver output signal may include a sine wave signal and a cosine wave signal.

The storage 10 may store a low pass filtering algorithm, a band pass filtering algorithm, a differential algorithm, or the like.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The excitation signal generator 20 may receive a square wave signal used to generate an excitation signal from the controller 30 and may filter the square wave signal to generate the excitation signal. In this case, the excitation signal may be a sine wave signal having a certain frequency.

Such an excitation signal generator 20 may be implemented as a combination of, for example, a band pass filter (BPF) and a low pass filter (LPF). In this case, when the square wave signal passes through the BPF and then passes through the LPF, it may be converted into an excitation signal in the form of a sine wave. The excitation signal generator 20 may include a square wave to sine wave converter.

For reference, the resolver 200 may be an analog angle sensor which converts a mechanical angular displacement (e.g., a rotation angle of a rotor) of a motor into an electrical signal using an electromagnetic induction phenomenon. Such a resolver 200 may receive the excitation signal from the excitation signal generator 20 and may modulate the excitation signal by means of its stator coil, thus generating a sine wave signal and a cosine wave signal.

The controller 30 may perform the overall control such that respective components may normally perform their own functions. Such a controller 30 may be implemented in the form of hardware, may be implemented in the form of software, or may be implemented in the form of a combination thereof. Preferably, the controller 30 may be implemented as, but not limited to, a microprocessor.

Particularly, the controller 30 may perform a variety of control in a process of differentiating a resolver output signal to obtain a differential signal, detecting a time when the differential signal meets a reference voltage as a peak time of the resolver output signal, and calculating a phase delay time of the resolver output signal within a reference range based on the peak time of the resolver output signal and an edge time of a square wave signal for excitation signal generation. Hereinafter, the operation of the controller 30 will be described in detail with reference to FIGS. 2 and 3.

Figure 2:
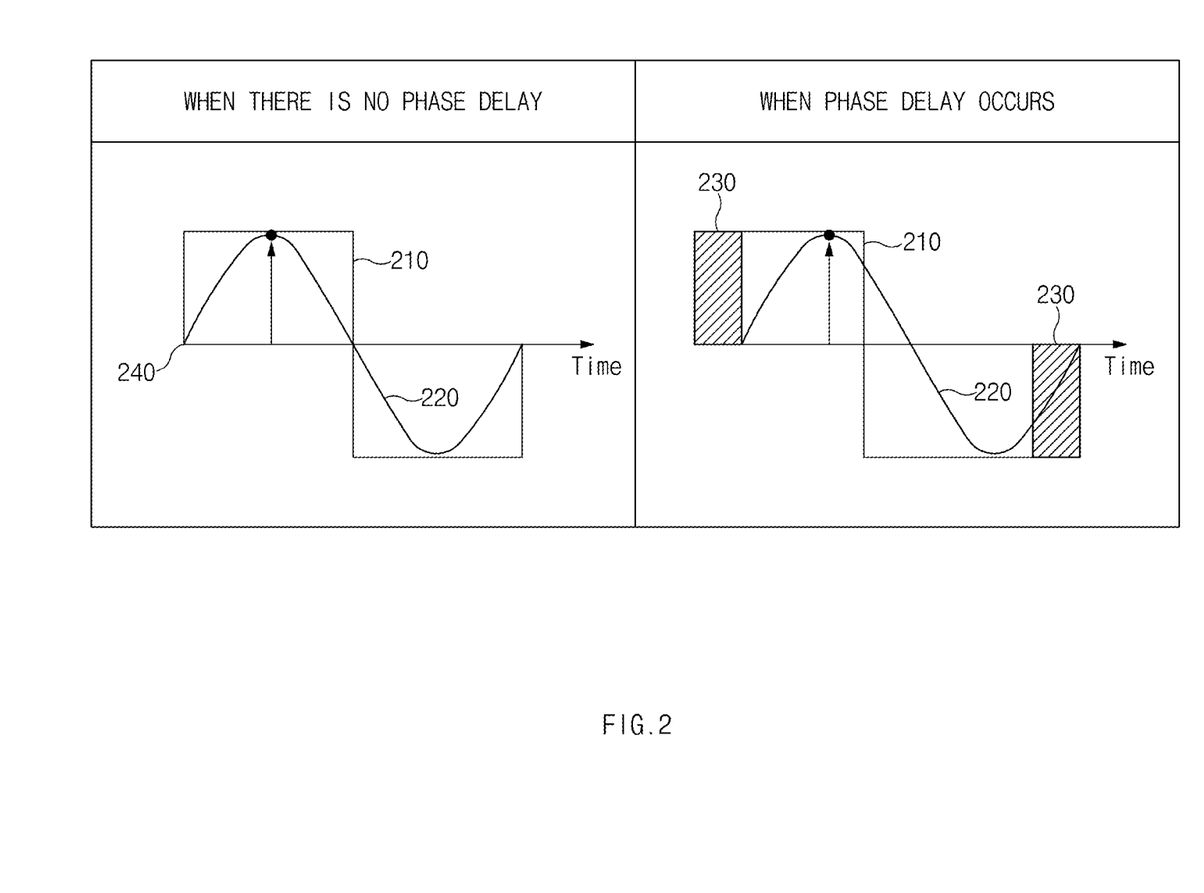
FIG. 2 is a drawing illustrating a phase delay time of a resolver output signal detected by a controller provided in an apparatus for detecting a phase delay of a resolver in one form of the present disclosure.

FIG. 2 is a drawing illustrating a phase delay time of a resolver output signal detected by a controller provided in an apparatus for detecting a phase delay of a resolver in some forms of the present disclosure.

In FIG. 2, the horizontal axis indicates time, reference numeral '210' indicates a square wave signal used to generate an excitation signal, reference numeral '220' indicates a resolver output signal, and reference numeral '230' indicates a phase delay.

As shown in FIG. 2, when a phase delay does not occur in the resolver output signal 220, it may be seen that an edge time 240 of the square wave signal 210 and a start time 240 of the resolver output signal 220 are the same as each other and that a phase of the square wave signal 210 and a phase of the resolver output signal 220 are the same as each other. However, when the phase delay 230 occurs in the resolver output signal 220, it may be seen that the edge time 240 of the square wave signal 210 and the start time 240 of the resolver output signal 220 differ from each other and that the phase of the square wave signal 210 and the phase of the resolver output signal 220 differ from each other.

Figure 3:
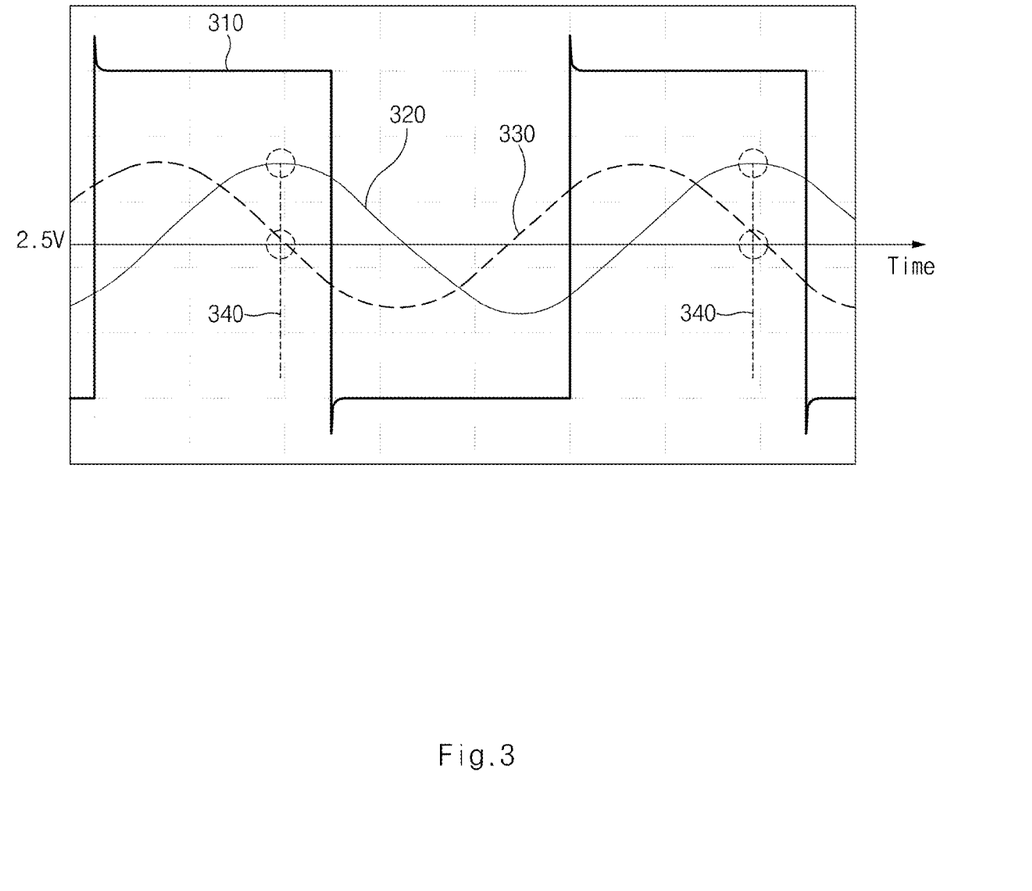
FIG. 3 is a drawing illustrating a process of detecting a peak time of a resolver output signal in a controller provided in an apparatus for detecting a phase delay of a resolver in one form of the present disclosure.

FIG. 3 is a drawing illustrating a process of detecting a peak time of a resolver output signal in a controller provided in an apparatus for detecting a phase delay of a resolver in some forms of the present disclosure.

In FIG. 3, reference numeral '310' indicates a square wave signal transmitted to an excitation signal generator 20 by the controller 30, reference numeral '320' is a resolver output signal and indicates, for example, a sine wave signal, reference numeral '330' indicates a differential signal obtained by differentiating the sign wave signal at the controller 30, and reference numeral '340' indicates a time when the differential signal meets a reference voltage, that is, a peak time of the resolver output signal. Herein, the reference voltage may be generally set to 0 V. As shown in FIG. 3, when an offset voltage (e.g., 2.5 V) is applied to the differential signal 330, the reference voltage may be an offset voltage. In this case, because the differential signal 330 reflects a slope component of the sine wave signal 320, the controller 30 may detect a peak of the sine wave signal 320 at high accuracy.

As shown in FIG. 3, the controller 30 may differentiate the sine wave signal 320 to derive the differential signal 330 from the sine wave signal 320 and may detect a time 340 when the differential signal 330 meets the time axis. In this case, because the offset voltage (e.g., 2.5 V) is applied to the differential signal 330, the time axis may be 2.5 V.

The controller 30 may determine a time when the differential signal 330 meets the reference voltage as a peak time of the sine wave signal 320 and may calculate a phase delay time of the sine wave signal 320 based on the peak time of the sine wave signal 320 and an edge time (e.g., a rising edge or a falling edge) of the square wave signal 310. In this case, as shown in FIG. 2, the controller 30 knows a state where there is no phase delay of the resolver output signal compared to the square wave signal. The controller 30 may calculate a phase delay time of the sine wave signal 320. Herein, when a difference between the edge time of the square wave signal 310 and the peak time of the sine wave signal 320 departs from a reference range, the controller 30 may determine a current state as an error. Hereinafter, a detailed configuration of the controller 30 will be described with reference to FIG. 4.

Figure 4:
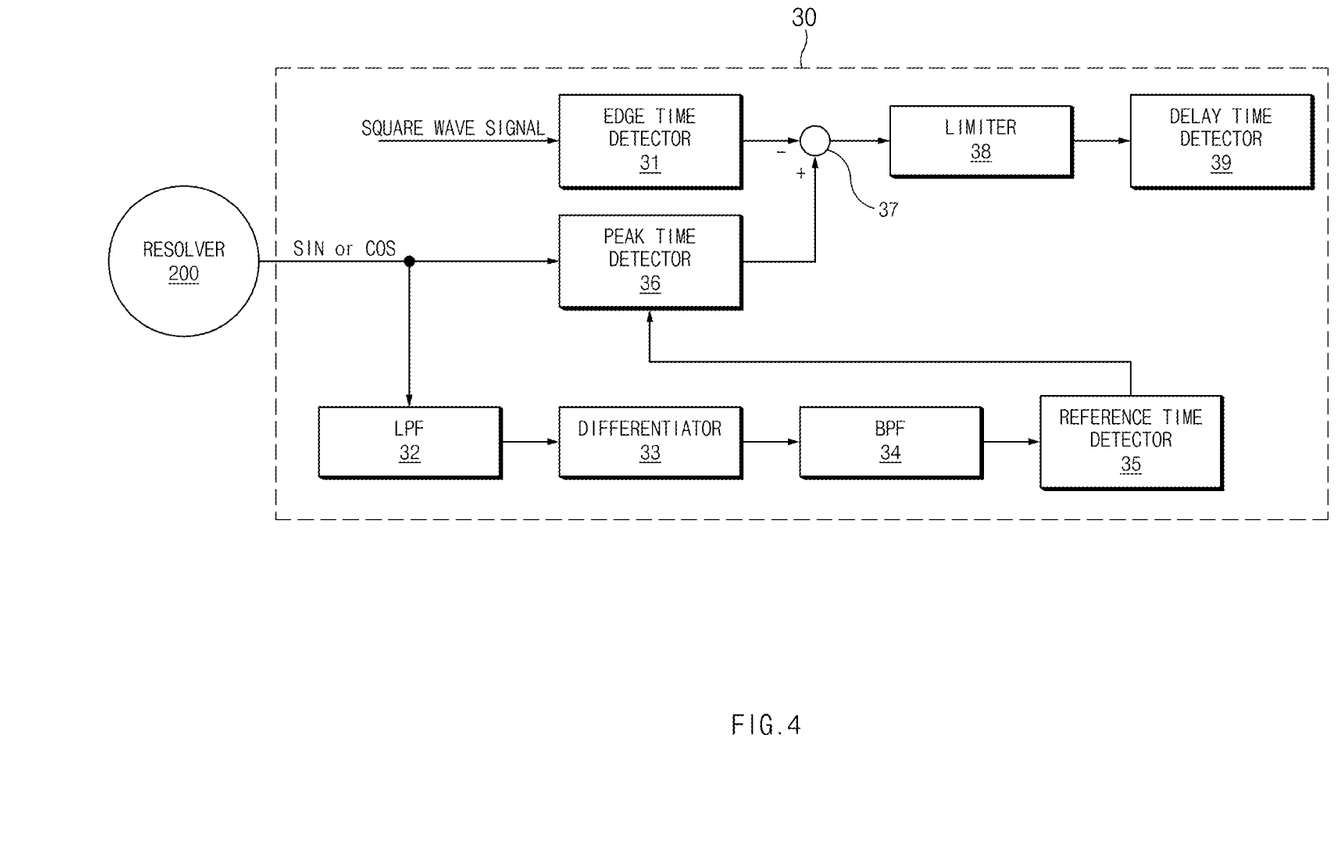
FIG. 4 is a block diagram illustrating a detailed configuration of a controller provided in an apparatus for detecting a phase delay of a resolver in one form of the present disclosure.

FIG. 4 is a block diagram illustrating a detailed configuration of a controller provided in an apparatus for detecting a phase delay of a resolver in some forms of the present disclosure.

As shown in FIG. 4, a controller 30 provided in the apparatus for detecting the phase delay of the resolver in some forms of the present disclosure may include an edge time detector 31, a low pass filter (LPF) 32, a differentiator 33, a band pass filter (BPF) 34, a reference time detector 35, a peak time detector 36, a subtractor 37, a limiter 38, and a delay time calculator 39.

The edge time detector 31 may detect an edge time (e.g., a rising edge or a falling edge) of a square wave signal 310 used to generate an excitation signal by an excitation signal generator 20 of FIG. 1. In this case, the edge time detector 31 knows a frequency and an amplitude of the square wave signal 310.

The LPF 32 maybe a filter which removes noise of a resolver output signal 320. It is preferable that a cut-off frequency of about 100 times compared to a frequency of the resolver output signal 320 is set in the LPF 32 to minimize a delay time in the filtering process.

The differentiator 33 may differentiate the resolver output signal 320, the noise of which is removed by the LPF 32, to derive a differential signal 330 from the resolver output signal 320.

The BPF 34 may filter the differential signal 330 output from the differentiator 33 to extract, for example, a 10-kHz band differential signal. In this case, it is preferable that a cut-off frequency of about 100 times compared to a frequency of the resolver output signal 320 is set in the BPF 34 to minimize a delay time in the filtering process.

The reference time detector 35 may detect a time when the differential signal passing through the BPF 34 meets a reference voltage.

The peak time detector 36 may detect the time detected by the reference time detector 35 as a peak time of the resolver output signal 320.

The subtractor 37 may subtract the edge time (e.g., the rising edge) of the square wave signal 310 detected by the edge time detector 31 from the peak time of the resolver output signal 320, which is detected by the peak time detector 36.

When the result subtracted by the subtractor 37 departs from a reference range, the limiter 38 may remove the subtracted result.

The delay time calculator 39 may calculate a phase delay time of the resolver output signal 320 based on the subtracted result passing through the limiter 38.

Figure 5A:
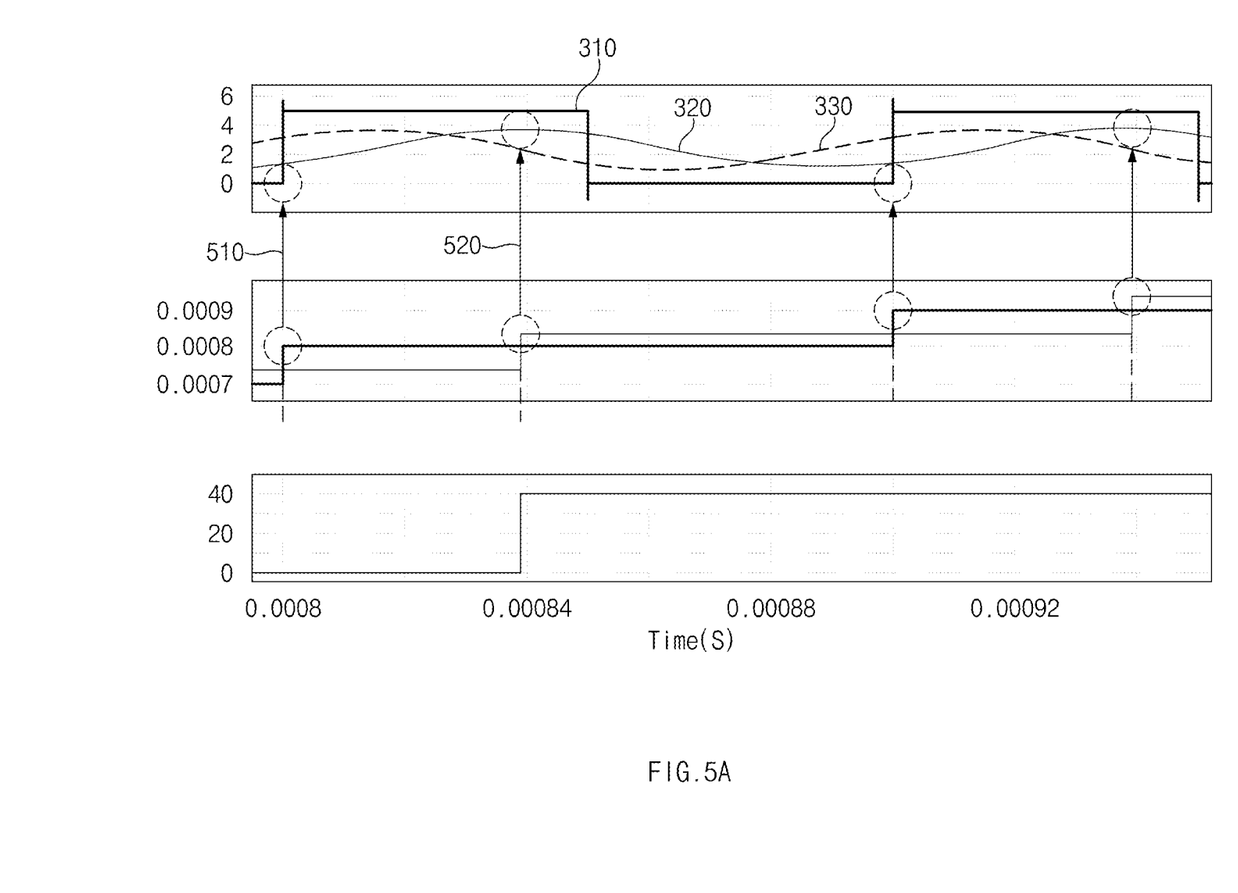
FIGS. 5A and 5B are drawings illustrating an analysis of one performance of an apparatus for detecting a phase delay of a resolver in one form of the present disclosure.
Figure 5B:
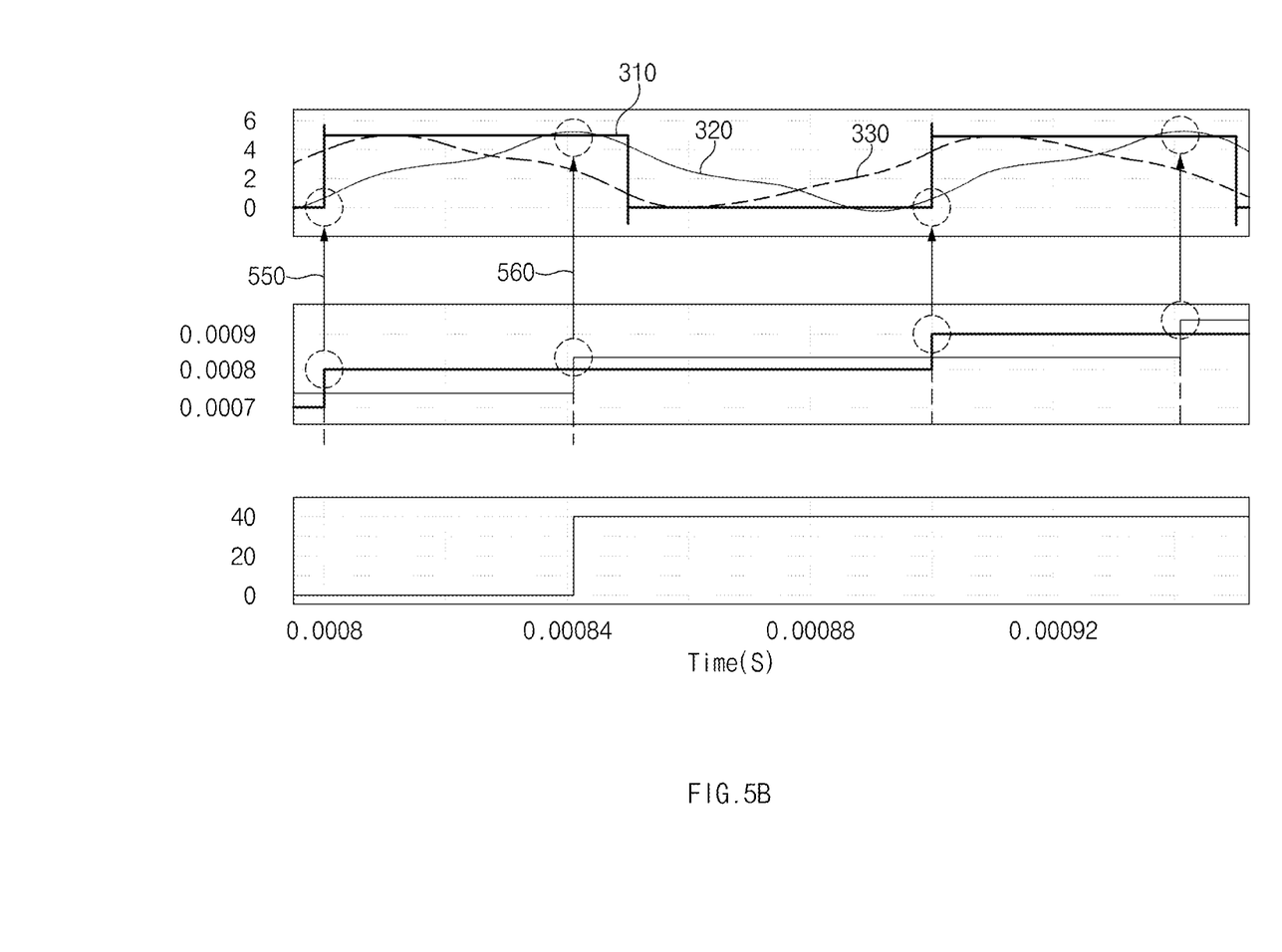

FIGS. 5A and 5B are drawings illustrating an analysis of one performance of an apparatus for detecting a phase delay of a resolver in some forms of the present disclosure.

FIG. 5A is a drawing illustrating an analysis of performance of an apparatus 100 for detecting a phase delay of a resolver, when there is no distortion in a sine wave signal 320. It is verified that a controller 30 accurately detects a rising edge time 510 of a sine wave signal 310 and accurately detects a peak time 520 of a sine wave signal 320 with reference to FIG. 5A.

FIG. 5B is a drawing illustrating an analysis of performance of the apparatus 100 for detecting the phase delay of the resolver, when distortion occurs in the sine wave signal 320. It is verified that the controller 30 accurately detects the rising edge time 550 of the square wave signal 310 and accurately detects the peak time 560 of the sine wave signal 320 with reference to FIG. 5B.

As a result, it may be seen that the apparatus 100 for detecting the phase delay of the resolver in some forms of the present disclosure indicates optimal performance irrespective of whether distortion occurs in the sine wave signal 320 which is the resolver output signal.

Figure 6:
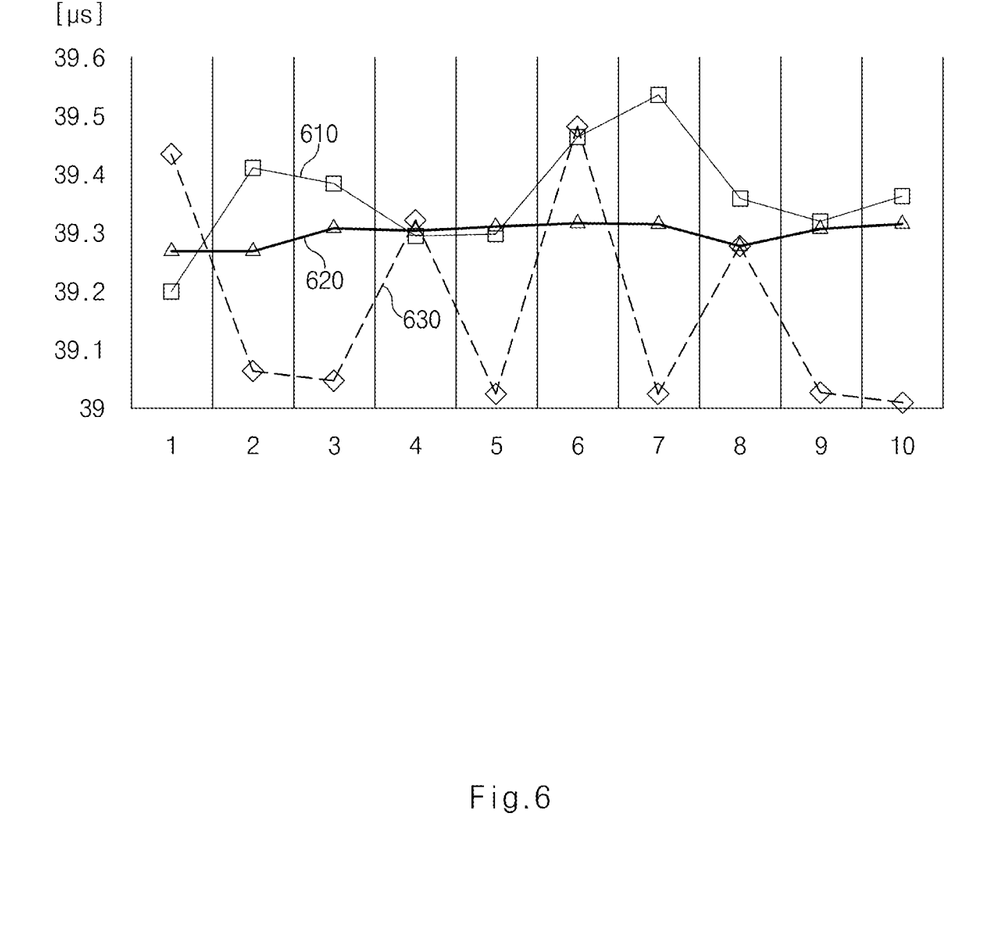
FIG. 6 is a drawing illustrating an analysis of another performance of an apparatus for detecting a phase delay of a resolver in one form of the present disclosure.

FIG. 6 is a drawing illustrating an analysis of another performance of an apparatus for detecting a phase delay of a resolver in some forms of the present disclosure.

In FIG. 6, reference numeral '610' indicates a phase delay time of a resolver output signal detected by a first existing scheme, reference numeral '620' indicates a phase delay time of a resolver output signal in some forms of the present disclosure, and reference numeral '630' indicates a phase delay time of a resolver output signal detected by a second existing scheme.

As shown in FIG. 6, it maybe seen that the phase delay time 610 of the resolver output signal detected by the first existing scheme shows a large width (e.g., 0.333 μs) between 39.2 μs and 39.6 μs and that the phase delay time 630 of the resolver output signal detected by the second existing scheme shows a very large width (e.g., 0.469 μs) between 39 μs and 39.5 μs.

On the other hand, it may be seen that the phase delay time 620 of the resolver output signal in some forms of the present disclosure has a stable width (e.g., 0.047 μs) between 39.2 μs and 39.3 μs.

Figure 7:
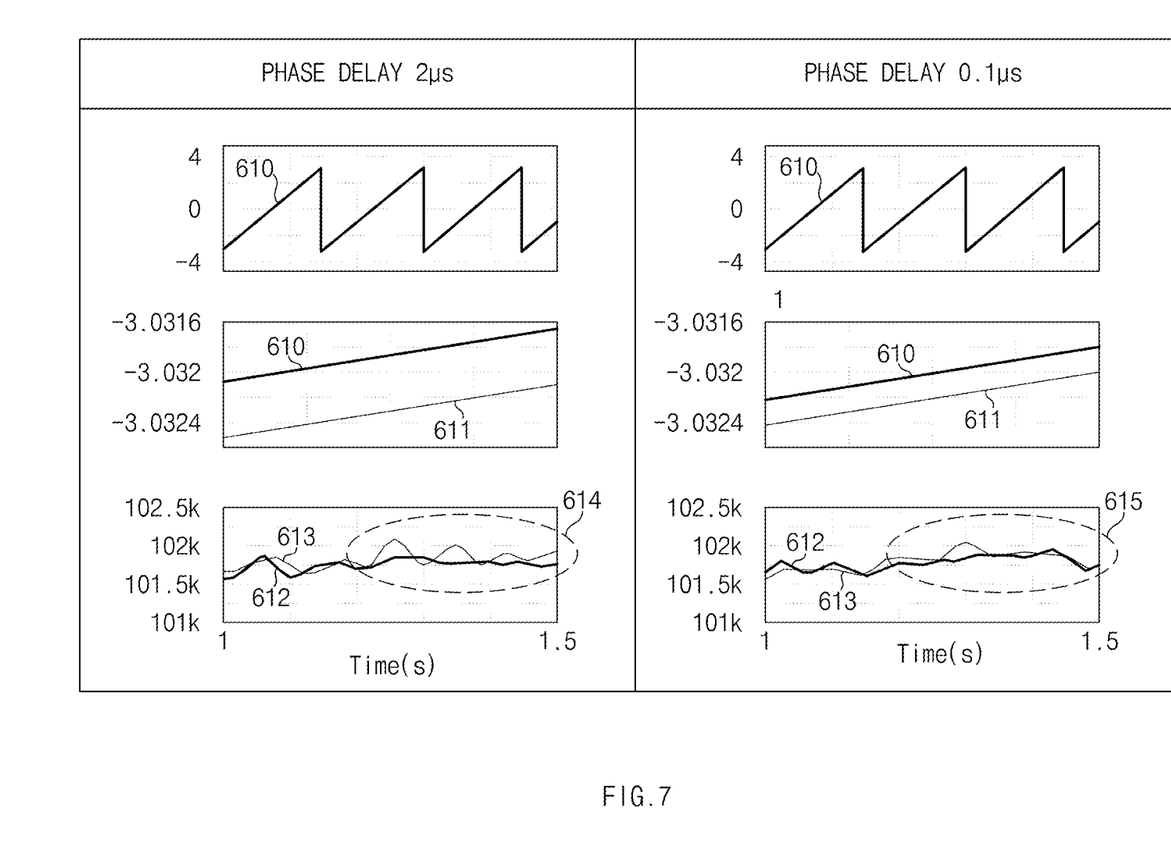
FIG. 7 is a drawing illustrating an analysis of another performance of an apparatus for detecting a phase delay of a resolver in one form of the present disclosure.

FIG. 7 is a drawing illustrating an analysis of another performance of an apparatus for detecting a phase delay of a resolver in some forms of the present disclosure, which illustrates a relationship between a phase delay of a resolver output signal and a drive power of a motor.

In FIG. 7, reference numeral '610' indicates a normal phase angle, reference numeral '611' indicates a phase angle where a phase delay occurs, reference numeral '612' indicates a normal drive power of the motor, reference numeral '613' indicates a drive power of the motor, when a phase delay occurs in a resolver output signal, reference numeral '614' indicates an error of a drive power of the motor, when a phase delay time of the resolver output signal is 2 μs, and reference numeral '615' indicates an error of a drive power of the motor, when a phase delay time of the resolver output signal is 1 μs.

As a result, it may be seen that the longer the phase delay time of the resolver output signal, the larger the error of the drive power of the motor.

Thus, because the apparatus 100 for detecting the phase delay of the resolver in some forms of the present disclosure is able to be used to compensate for a phase delay time of the resolver output signal, it may contribute to optimizing a drive power of the motor. In other words, the apparatus 100 for detecting the phase delay of the resolver in some forms of the present disclosure may be applied to a system for controlling a drive power of the motor.

Figure 8:
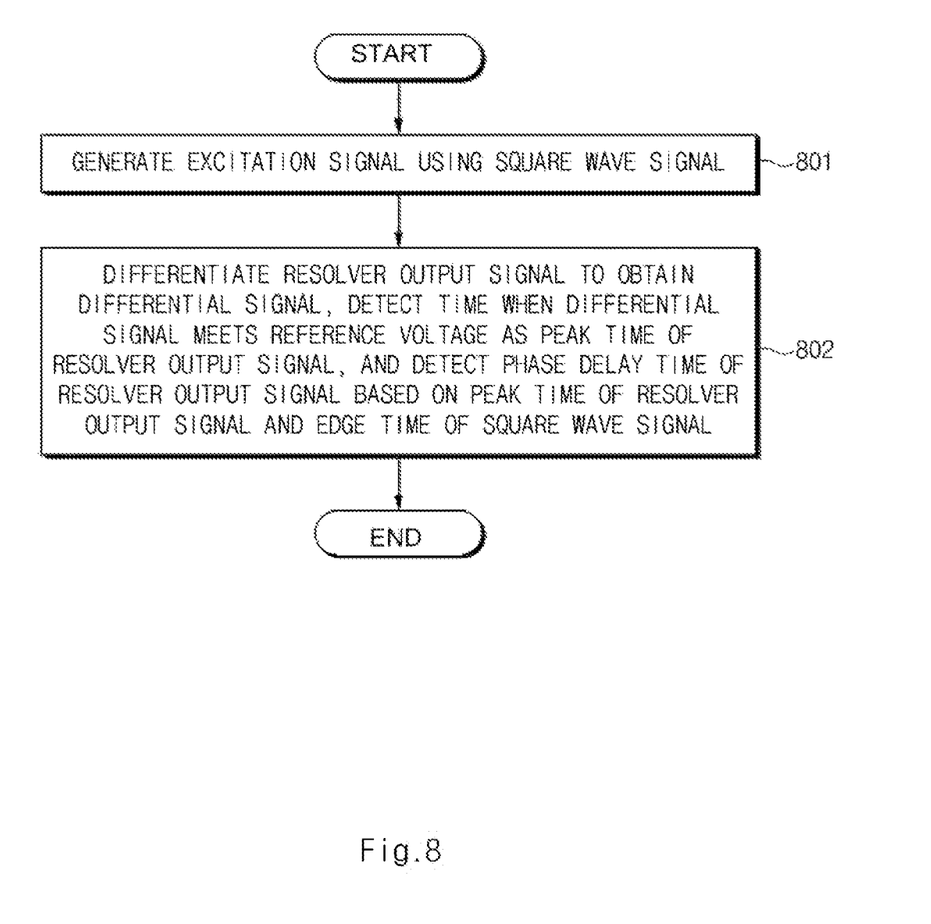
FIG. 8 is a flowchart illustrating a method for detecting a phase delay of a resolver in one form of the present disclosure.

FIG. 8 is a flowchart illustrating a method for detecting a phase delay of a resolver in some forms of the present disclosure.

First of all, in operation 801, an excitation signal generator 20 of FIG. 1 may generate an excitation signal using a square wave signal 310 of FIG. 3.

In operation 802, a controller 30 of FIG. 1 may differentiate a resolver output signal 320 of FIG. 3 to obtain a differential signal 330 of FIG. 3, may detect a time 340 when the differential signal 330 meets a reference voltage as a peak time 340 of the resolver output signal 320, and may detect a phase delay time of the resolver output signal 320 based on the peak time 340 of the resolver output signal 320 and an edge time of the square wave signal 310.

Figure 9:
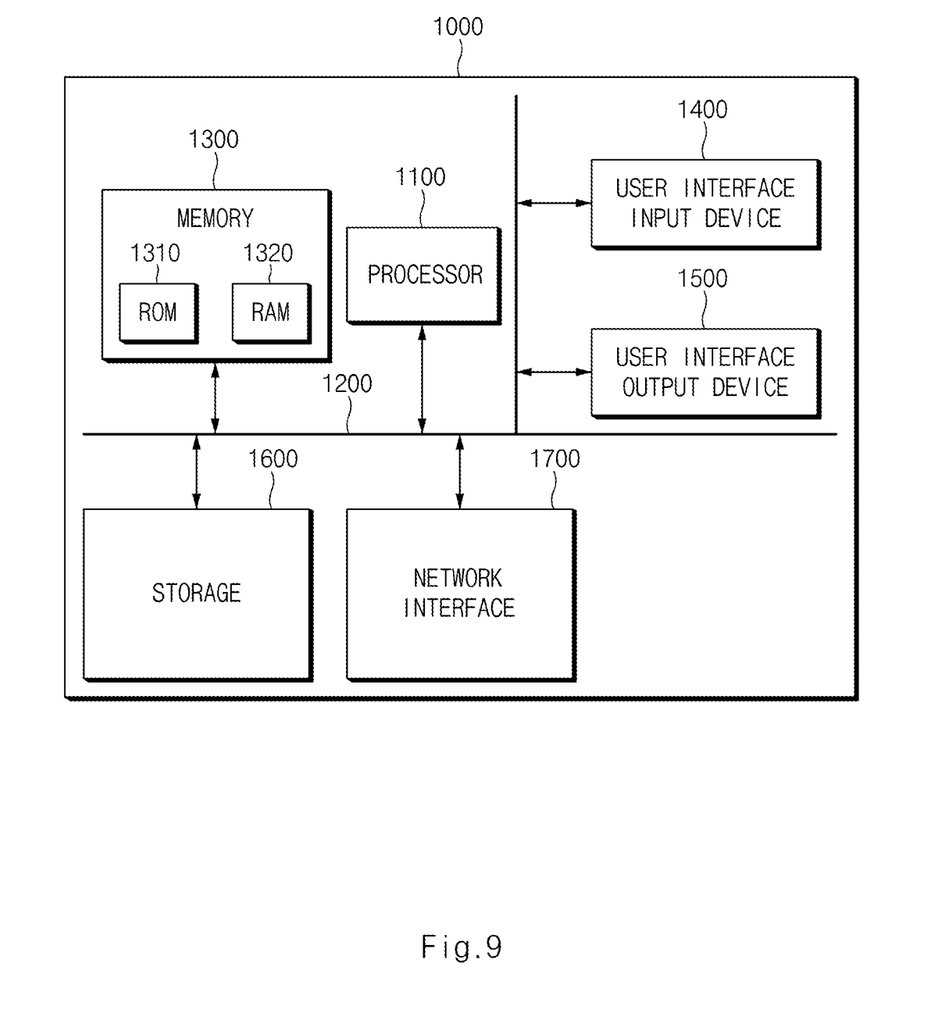
FIG. 9 is a block diagram illustrating a computing system for executing a method for detecting a phase delay of a resolver in one form of the present disclosure.

FIG. 9 is a block diagram illustrating a computing system for executing a method for detecting a phase delay of a resolver in some forms of the present disclosure.

Referring to FIG. 9, the above-mentioned method for detecting the phase delay of the resolver in some forms of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus and the method for detecting the phase delay of the resolver in some forms of the present disclosure may be provided to differentiate a resolver output signal to obtain a differential signal, detect a time when the differential signal meets a reference voltage as a peak time of the resolver output signal, and calculate a phase delay time of the resolver output signal within a reference range based on the peak time of the resolver output signal and an edge time of a square wave signal for excitation signal generation, thus detecting the phase delay time of the resolver output signal at high accuracy, although distortion occurs in the resolver output signal, and quickly detecting the phase delay time of the resolver output signal.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms of the present disclosure. The scope of the present disclosure should be construed on the basis of the accompanying claims, and all the technical ideas within the scope equivalent to the claims should be included in the scope of the present disclosure.

What is claimed is:

1. An apparatus for detecting a phase delay of a resolver, the apparatus comprising:
   a resolver configured to output a signal corresponding to a rotation angle of a motor;
   an excitation signal generator configured to generate an excitation signal using a square wave signal; and
   a controller configured to:
      differentiate the signal to obtain a differential signal;
      detect a time when the differential signal meets a reference voltage as a peak time of the signal; and
      detect a phase delay time of the signal based on the peak time of the signal and an edge time of the square wave signal.

2. The apparatus of claim 1, wherein the excitation signal generator is configured to:
   filter the square wave signal to generate the excitation signal.

3. The apparatus of claim 2, wherein the excitation signal generator includes a combination of a band pass filter (BPF) and a low pass filter (LPF).

4. The apparatus of claim 1, wherein the controller is configured to:
   determine that a current state is an error when a difference between the edge time of the square wave signal and the peak time of the signal is greater than a reference range.

5. The apparatus of claim 1, wherein the controller further includes:
   an edge time detector configured to detect a rising edge time of the square wave signal;
   a low pass filter (LFP) configured to remove noise from the signal;
   a differentiator configured to differentiate the signal to output the differential signal;
   a band pass filter (BPF) configured to filter the differential signal;
   a reference time detector configured to detect a time when the differential signal meets the reference voltage;
   a peak time detector configured to detect the time as the peak time of the signal;

a subtractor configured to subtract the rising edge time of the square wave signal from the peak time; and a delay time calculator configured to calculate the phase delay time of the signal based on a result subtracted by the subtractor.

6. The apparatus of claim 5, further comprising:

a limiter configured to limit a range of the result subtracted by the subtractor.

7. The apparatus of claim 6, wherein the delay time calculator is configured to:

calculate the phase delay time of the signal based on the subtracted result.

8. The apparatus of claim 5, wherein the LPF has a set cut-off frequency greater than a frequency of the signal or equal to a reference value.

9. The apparatus of claim 1, wherein the apparatus is applied to a system for controlling a drive power of the motor.

10. A method for detecting a phase delay of a resolver, the method comprising:

generating, by an excitation signal generator, an excitation signal using a square wave signal;

differentiating, by a controller, a resolver output signal to obtain a differential signal;

detecting, by the controller, a time when the differential signal meets a reference voltage as a peak time of the resolver output signal; and detecting, by the controller, a phase delay time of the resolver output signal based on the peak time of the resolver output signal and an edge time of the square wave signal.

11. The method of claim 10, wherein the generating of the excitation signal includes:

filtering the square wave signal to generate the excitation signal.

12. The method of claim 11, wherein the generating of the excitation signal includes:

sequentially passing the square wave signal through a band pass filter (BPF) and a low pass filter (LPF) to generate the excitation signal.

13. The method of claim 10, wherein the detecting of the phase delay time of the resolver output signal includes:

when a difference between the edge time of the square wave signal and the peak time of the resolver output signal is greater than a reference range, determining that a current state is an error.

14. The method of claim 10, wherein the detecting of the phase delay time of the resolver output signal includes:

detecting a rising edge time of the square wave signal;
removing noise of the resolver output signal;
differentiating the resolver output signal to output the differential signal;
band pass filtering the differential signal;
detecting a time when the band pass filtered differential signal meets the reference voltage;
detecting the detected time as the peak time of the resolver output signal;
subtracting the detected rising edge time of the square wave signal from the detected peak time of the resolver output signal; and
calculating the phase delay time of the resolver output signal based on a subtracted result.

15. The method of claim 14, further comprising:
limiting a range of the subtracted result; and
calculating the phase delay time of the resolver output signal based on the subtracted result.

16. The method of claim 14, wherein the removing of the noise of the resolver output signal includes:
removing the noise of the resolver output signal using a low pass filter (LPF); and
setting a cut-off frequency greater than a frequency of the resolver output signal or equal to a reference value in the LPF.

17. An apparatus for detecting a phase delay of a resolver, the apparatus comprising:
an edge time detector configured to detect a rising edge time of a square wave signal;
a low pass filter (LFP) configured to remove noise of a resolver output signal;
a differentiator configured to differentiate the resolver output signal to output a differential signal;
a band pass filter (BPF) configured to filter the differential signal;
a reference time detector configured to detect a time when the differential signal passing through the BPF meets a reference voltage;
a peak time detector configured to detect the time as a peak time of the resolver output signal;
a subtractor configured to subtract the rising edge time of the square wave signal from the peak time of the resolver output signal; and
a delay time calculator configured to calculate a phase delay time of the resolver output signal based on a result subtracted by the subtractor.

18. The apparatus of claim 17, further comprising:
a limiter configured to limit a range of the result subtracted by the subtractor.

19. The apparatus of claim 18, wherein the delay time calculator is configured to:
calculate the phase delay time of the resolver output signal based on the subtracted result.

20. The apparatus of claim 17, wherein the LPF has a set cut-off frequency greater than a frequency of the resolver output signal or equal to a reference value.

* * * * *